Patented May 8, 1934

1,957,437

UNITED STATES PATENT OFFICE 1,957,437

MANUFACTURE OF MODIFIED OIL PRODUCTS FROM FATTY OILS

László Auer, Budapest, Hungary, assignor to J. Randolph Newman, Washington, D. C., as trustee No Drawing. Application April 30, 1929, Serial No. 359,427. In Great Britain May 8, 1928

20 Claims. (Cl. 106—23)

This invention relates to the manufacture of modified oil products from fatty oils, and it comprises processes for making such products wherein said fatty oil, advantageously a drying oil, is mixed with solid, substantially water free alkaline modifying agents of the class consisting of alkali metals, alkali metal oxides and alkali metal hydroxides, and the mixture is heated to at least 200° C. until the desired oil product is obtained, the heating being advantageously effected under vacuum, and wherein the oil products are sometimes subsequently vulcanized; all as more fully hereinafter set forth and as claimed.

I have discovered that under suitable conditions of pressure and temperature alkaline modifying agents of the class consisting of alkali metals, alkali metal oxides and alkali metal hydroxides, separately or in mixtures, may be dispersed e. g. dissolved in fatty oils or resins or resins to give new and valuable products, and the solutions may be subjected to a heat treatment with or without a simultaneous or subsequent treatment with gases.

In certain cases in addition to these alkaline modifying agents, electrolytes, such as disclosed in my co-pending application Ser. No. 143,786 may be used as modifying agents.

It is known that solid, elastic, adhesive, sticky and plastic masses can be produced from drying or semi-drying fatty oils by the heating of the starting materials with either metallic magnesium, or iron in the form of ferrum hydrogenio reductum, or with or with small quantities of zinc or calcium or aluminium, during which process hydrogen is generated. It is known also that the oxides of these metals have a like influence, and that after being dissolved in drying oils, the latter become thicker and solidify to jelly-like products. Such materials have been offered for use in the linoleum industry in place of linoxin.

I have found that the dissolution of alkali metals gives essentially better results than that of the above mentioned other metals, and moreover, greater quantities of alkali metals may be readily dissolved in the starting materials than in the case of the other metals mentioned. The products obtained according to my invention are much better, stronger and more coherent than those obtainable through the use of other metals. This effect was quite unexpected, because the results obtainable with other metals are quite similar among themselves, while those from the alkali metals seem to be of a different character.

I have found further that not only the drying oils but also all other fatty oils (though perhaps not in equal measure) are subject to solidification through alkali metals, and that instead of the alkali metals proper, the alkali metal oxides and alkali metal hydroxides can also be advantageously applied. As in the case of the alkali metals, the alkali metal oxides and alkali metal hydroxides yield better products than other known oxides.

Accordingly the present invention comprises a process for the manufacture of modified oil products consisting of or containing saponaceous compounds of high molecular organic acids characterized by the fact that in materials consisting of or containing said acids or their derivatives alkali metals or their oxides or hydroxides are dissolved or dispersed with the aid of heat in the substantial absence of water at a temperature lying substantially at or between the limits of 100 and 300° C. There may be present during the heat treatment, in addition to the alkali metal or oxide or hydroxide thereof, an alkaline earth oxide or peroxide (for example, barium peroxide). The material during or after the heat treatment may be brought into intimate contact with a modifying-gas (for example, nitrogen, sulphur dioxide, hydrogen sulphide, carbon dioxide or oxygen). Alternating treatment with sulphur dioxide and hydrogen sulphide has been found to be specially advantageous in certain cases, and the vulcanizing treatment which results from the formation of sulphur in situ by such alternating gas treatment may be advantageously influenced e. g. by the use of benzoquinone as an accelerator.

The products may be subsequently subjected to vulcanization, for example, by heating with sulphur with or without accelerators (e. g. tetramethylthiuram disulphide, mercaptobenzthiazole etc.) or they may be emulsified in water by the aid of the usual reagents.

The materials produced with alkali metals and their oxides and hydroxides are harder and have a lighter colour than those produced by the use of other metals and their oxides and hydroxides. They can be used as binding materials in the varnish and linoleum industries and show improved drying velocity and improved ageing properties compared with those of the starting materials. They can also be used in rubber manufacture, as, for instance, the oil products solidified by means of alkali metals and their oxides and hydroxides yield after vulcanization rubber substitutes which possess remarkably good tensile properties. In the vulcanization, an activator, such as zinc oxide, and an accelerator, such as triphenylguanidine, mercaptobenzthiazole or tetraethylthiuram disulphide, may be advantageously used.

A quite special and new application for the new products is found in the soap industry. It is known that hitherto it has been possible to produce from fatty oils having a moderately high unsaturation value by the usual saponification methods with alkaline solutions only soft soaps, which are very difficult to separate from their mother-lye. By using in my invention an amount of solid alkali hydroxide (or metal or oxide) which is chemically equivalent to the amount of caustic solution required to convert the oil into a superfatted, neutral or alkaline soap, I obtain, without addition of water a highly concentrated, hard soap. By suitable adjustment of the heating period, temperature, etc., I have obtained in this way concentrated soaps of all degrees of hardness from that of soft soap to that of sealing wax.

These soap-like products manufactured according to my invention show a good washing effect and lather, and may be mixed with the usual soap ingredients and filling materials. They are easily moulded, e. g. by pouring the molten soap masses into moulds.

If the glycerine is fully, or partly, retained it acts as a plasticizer.

Although the dissolution of alkali metals and their oxides and hydroxides is quite simple and rapid, in some cases, when it is necessary to accelerate it further, it is advantageous to add metal-free organic materials, such as, for instance, phenols, arylamines, hydrocarbons, ketones, alcohols, formaldehyde, thiocarbanilide, benzidine, hexamethylene-tetramine, 2:3 - hydroxynaphthoic acid, alpha-naphthol, quinoline, pyrogallol, benzene, glycerol and phthalimide.

The above mentioned secondary materials (the metal-free organic bodies) may be chosen so as to cause the final product to be softer or harder or more elastic.

The reaction temperature may vary between 100° and 300° C. It is found that lithium and sodium and their oxides or hydroxides yield harder products than potassium and its oxide or hydroxide, and further that, under similar conditions, the products are proportionately harder as the amount of the dissolved reagent, the temperature, and/or the duration of heating is increased. By the terms "hardening" and "solidification", I intend to indicate not only that hard or solid materials are produced from liquids but also that a partial hardness or increase in solidity characterized by a higher melting point, may result.

I have found that products obtained under application of vacuum are clearer and in most cases harder than those produced at normal atmospheric pressures. It is also possible, however, to obtain good results at normal atmospheric pressure and also at increased pressures.

In addition to the applications already mentioned, the new oil products can be utilized as plastic masses for the most diverse purposes, and as varnish starting materials.

A further increased solidification is possible when metal peroxides are used with the alkali metals etc., the effect being equivalent to a treatment with oxygen.

In many cases it is of advantage to subject the reaction mass to a gas treatment, for instance the blowing through of nitrogen or other gases. Such a gas treatment promotes solidification.

The reaction products obtained can be vulcanized and they can also be further used in the form of emulsions. For the purposes of vulcanization, the use of vulcanization accelerators with or without an activator (zinc oxide) is advantageous. Fillers, pigments etc. may also be incorporated.

Improved products may, in many cases, be obtained by subjecting the materials undergoing treatment to the influence of a short-wave radiation (e. g. X-rays, ultra-violet rays etc.).

My invention is illustrated but not limited by the following examples, in which the parts are by weight:

Example I 150 parts of linseed oil are heated under vacuum to 280–300° C. for 1 to 2 hours with 17.4 parts of solid caustic soda. The product is poured into moulds and on cooling forms a soft solid which may be used as a super-fatted soap.

Example II 300 parts of light coloured fish oil are heated in an open enamelled vessel with 27.6 parts of lithium hydroxide for 2 to 5 hours at temperatures above 250° C. The product is a hard solid suitable for use as a hard alkaline soap. The ordinary filling materials used in the soap industry may be incorporated into the molten product. If a water containing soap is required, water may be kneaded into the mass.

Example III 150 parts of sunflower oil are heated under vacuum to temperatures greater than 250° C. with a mixture of 16 parts of sodium oxide and 2 parts of para-cresol. The product has good detergent properties.

Example IV 300 parts of rape oil are heated under vacuum to temperatures above 250° C. for 2 to 5 hours with 15 parts of solid potassium hydroxide. The product on cooling forms a plastic mass, which on heating with 30 parts of sulphur, 6 parts of zinc oxide and 1½ parts of triphenylguanidine to 140° C. gives a vulcanized product which may be used as a rubber substitute.

Example V 150 parts of castor oil are heated under vacuum at temperatures above 250° C. for 2 to 5 hours with a mixture of 2½ parts of solid caustic soda and 2½ parts of barium peroxide. The modified oil so obtained may be vulcanized as described in Example 4, or used in the vulcanized form as a varnish material.

Example VI 100 parts of olive oil are heated in vacuum at 250–280° C. with 1 part of metallic potassium which has previously been pulverized in the usual way. The product may be readily emulsified and used for the manufacture of vulcanized emulsions.

What I claim is:

1. As an improvement in the manufacture of vulcanized solidified oil products from fatty oils, useful as rubber substitutes, the process which comprises mixing a fatty oil with a solid, substantially water free, alkaline modifying agent of the class consisting of alkali metals, alkali metal oxides and alkali metal hydroxid, heating the mixture to a temperature between 200 and 300° C. and continuing the heating at said temperatures until upon cooling, a solidified oil product is obtained, and then mixing the modified oil product thus obtained with sulphur and heating the sulfur-containing mixture to vulcanizing temperatures until a vulcanized product is obtained.

2. The process of claim 1, wherein the heat-treated oil mixture is vulcanized with the sulphur in the presence of an activator and ultra-accelerator thereby facilitating the vulcanization at lower temperatures.

3. The process of claim 1, wherein approximately 100 parts of the heat-treated oil mixture prior to vulcanization is mixed with 10 parts of sulphur, two parts of zinc oxid and a small amount of triphenylguanidine, and then the mixture thus obtained heated to 140° C. until a vulcanized product, useful as a rubber substitute is obtained.

4. As an improvement in the manufacture of solidified bodies from fatty oils, the step which comprises mixing a fatty oil, with a substantially water free, alkaline modifying agent of the class consisting of alkali metals, alkali metal oxids and alkali metal hydroxid, heating the mixture to a temperature between 200 and 300° C. and continuing the heating at said temperatures until upon cooling a solidified product is obtained.

5. The process of claim 4, wherein said alkaline modifying agent is an alkali metal hydroxid.

6. The process of claim 4, wherein the mixture of said oil and said modifying agent is heated under reduced pressure, thereby preventing oxidation of the heated oil and facilitating the bodying of said oil.

7. As an improvement in the manufacture of solidified bodies from fatty oils, the step which comprises mixing a solid substantially water free, alkali metal hydroxid with a drying fatty oil, heating the mixture to a temperature between 250 and 300° C. under reduced pressure until a solidified oil product is obtained.

8. The process of claim 7, wherein said drying oil is linseed oil.

9. As an improvement in the manufacture of solidified bodies from fatty oils, the step which comprises mixing about 100 parts of linseed oil with about 12 parts of a solid caustic soda, heating the mixture to between 280 and 300° C. under vacuum until a soft solid is obtained upon cooling and then cooling the heat-treated mixture.

10. As an improvement in the manufacture of solidified bodies from fatty oils, the process which comprises mixing approximately 100 parts of a fatty oil with between 2 to 12 parts of solid, substantially water free alkali metal hydroxid, heating the mixture to between 200 and 300° C. until a substantially thickened oil is obtained and then cooling the mixture, thereby producing improved modified oil products.

11. As an improvement in the manufacture of vulcanized oil products useful as rubber substitutes and the like, the improvement which comprises substantially bodying a fatty oil, prior to vulcanization, by mixing said oil with an amount of a solid, substantially water-free, alkaline modifying agent of the class consisting of alkali metals, alkali metal oxids and alkali metal hydroxid, sufficient to solidify said fatty oil when heated to temperatures above 200° C., and then heating said oil until a solidified body is obtained upon cooling, the solidified oil thus obtained being adaptable to vulcanization, yielding superior improved vulcanized products.

12. As an improvement in the manufacture of vulcanized oil products useful as rubber substitutes and the like, the improvement which comprises substantially bodying said fatty oil, prior to vulcanization, by means of heat in the presence of a minor amount of solid alkali metal hydroxid, thus reducing the amount of vulcanization necessary to produce solid vulcanized oil products, said vulcanized oil products having improved properties, said bodying by heat, being at temperatures between 200° and 300° C.

13. The process of claim 1, wherein approximately 5 parts of said alkaline modifying agent to 100 parts of said fatty oil is used.

14. The process of claim 1, wherein 100 parts of a drying fatty oil is mixed with about 5 parts of a solid water free, alkali metal hydroxide, the mixture heated to said temperatures under reduced pressure until a modified oil product is obtained, the modified oil product is mixed with sulphur, an activator and ultra-accelerator and the sulphur-containing mixture is heated to vulcanizing temperatures until a vulcanized oil product is obtained.

15. The process of claim 1, wherein 100 parts of rape oil is mixed with 5 parts of solid, substantial water free potassium hydroxide, the mixture is heated to above 250° C. under vacuum for between 2 to 5 hours, the modified oil product, so obtained, is mixed with 30 parts sulphur, 6 parts zinc oxide and 1.5 parts of triphenyl guanidine and the sulphur-containing mixture is heated to 140° C. until a vulcanized oil product is obtained.

16. The process of claim 7, wherein about 12 parts of said alkali metal hydroxide to 100 parts of said drying fatty oil is used.

17. The process of claim 10, wherein the heating to said temperatures is effected under vacuum.

18. The process of claim 11, wherein said heating is effected at temperatures between 250 and 300° C. under vacuum.

19. The process of claim 4, wherein 100 parts of said fatty oil is mixed with about 2.5 parts of a solid, substantial water free alkali metal hydroxide and 2.5 parts of an alkaline earth metal peroxide, and the said heating is effected under vacuum.

20. The process of claim 4, wherein 100 parts of castor oil is mixed with 2.5 parts of solid caustic soda and 2.5 parts of barium peroxide and the mixture is heated above 250° C. under vacuum for between 2 to 5 hours.

LÁSZLÓ AUER.